PULSE RECEIVER

Filed April 28, 1945

INVENTOR.
JOHN B. ATWOOD

BY H. S. Grover

ATTORNEY 2,937,270

PULSE RECEIVER

John B. Atwood, Riverhead, N.Y., assignor to Radio Corporation of America, a corporation of Delaware Application April 28, 1945, Serial No. 590,821

19 Claims. (Cl. 250—20)

This invention relates to a pulse communication receiver system of the type having a pulse amplitude selective circuit, and more particularly to a method of and apparatus for automatically controlling the gain of such a receiver. Stated in other words, the present invention concerns a pulse-amplitude-selective-automatic-gain-control (AGC) circuit for a pulse communication receiver.

One difficulty experienced in the prior art in attempting to equip a pulse receiver with an automatic gain control (AGC) circuit has been caused by the fact that there has been no way of discriminating between useful (signal) pulses and undesired (interfering) pulses. Where the undesired (interfering) pulses are of greater intensity than the desired (signal) pulses, the AGC, in such prior systems, adjusts the gain of the pulse receiver to follow the level of the undesired pulses, as a result of which the lower amplitude signal pulses cannot come through the receiver.

The present invention overcomes this difficulty and provides a pulse receiver which maintains the gain of the receiver at the proper level in the presence of interfering pulses which may be of higher amplitude than the desired pulses. The invention is effective in the presence of interfering radar pulses whether these pulses have a repetition rate which is the same or different from the desired signal pulses.

A feature of the invention lies in the use of a pulse oscillator which causes the gain of the receiver to vary periodically, in the absence of signals, and also in the use of a pilot tone whose modulation is superimposed on the signal pulses to thereby render this pulse oscillator ineffective. The frequency of this pilot tone is preferably outside the frequency response range of the message signals. For example, if the intelligence covers a frequency range from 300 to 3500 cycles, then the tone can be below 300 cycles (for example 250 cycles) or above 3500 cycles.

A more detailed description of the invention follows in conjunction with a drawing wherein.

Figures 1, 2, 3:
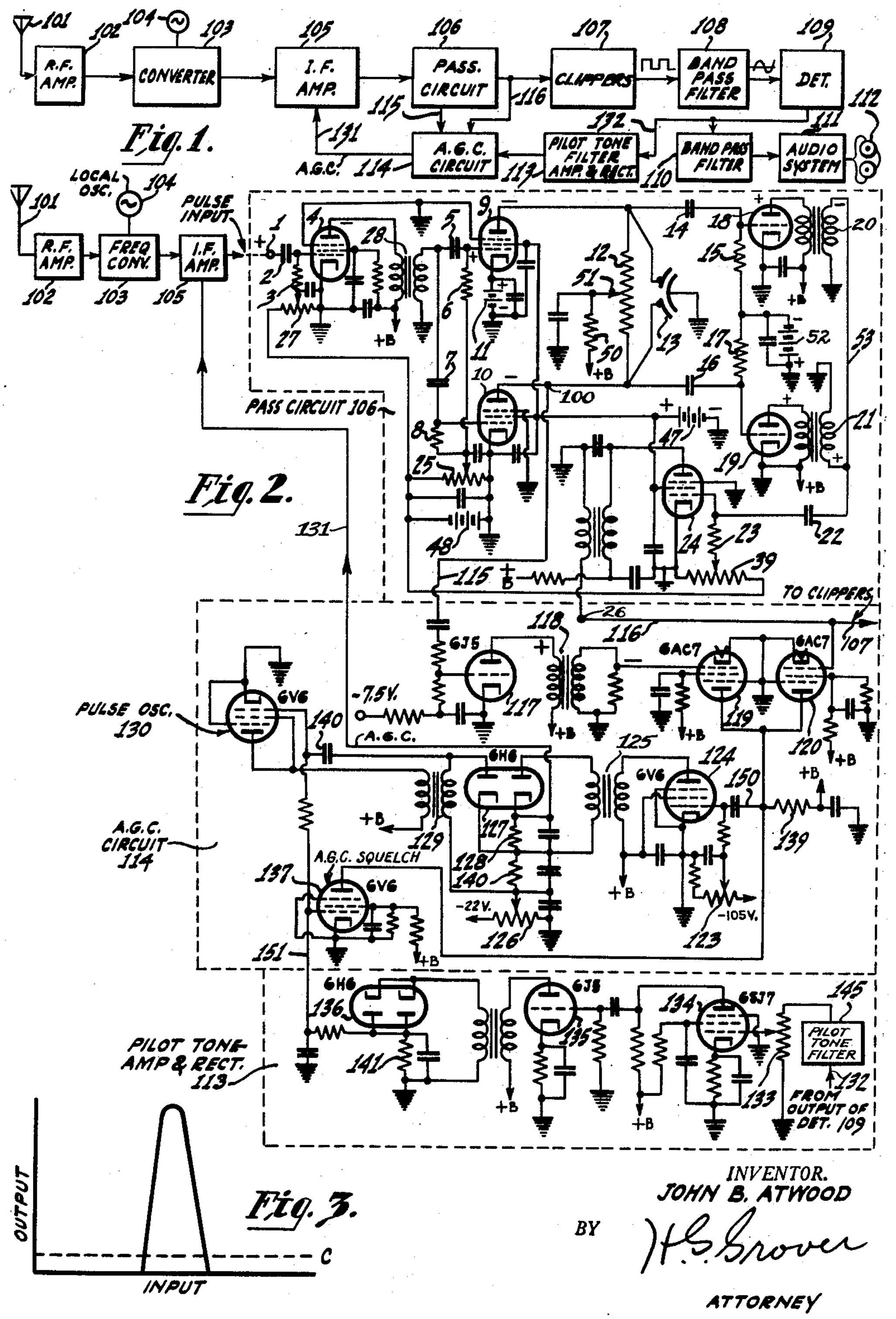
Fig. 1 illustrates, in box form, one embodiment of the invention.
Fig. 2 illustrates the circuit details of the pass circuit, the AGC circuit, and the pilot tone amplifier and rectifier circuit of Fig. 1, together with their connections to the remaining circuit elements of the system.
Fig. 3 graphically illustrates the input-output characteristic of the pulse amplitude selective circuit (pass circuit) of Figs. 1 and 2.

Fig. 1 diagrammatically shows a pulse communication receiver equipped with a pulse-amplitude-selective-automatic-gain-control circuit, for receiving pulses transmitted from a remotely located transmitter, not shown. These pulses are preferably of short time duration compared to the spaces or time intervals between adjacent pulses, and are modulated as to phase or frequency by the signal modulation. The receiving system includes a superheterodyne type of receiver having an energy collecting antenna 101, a radio frequency amplifier 102, a frequency converter 103 receiving the output from the amplifier 102 and also receiving oscillations from a local heterodyning oscillator 104, and an intermediate frequency amplifier 105 coupled to the output of the frequency converter 103. By way of example only, the pulses of energy collected by the antenna 101 may be of the order of several hundred megacycles and higher, whereas the pulses of intermediate frequency energy passed by the intermediate frequency amplifier 105 may be 30 megacycles. This intermediate frequency amplifier 105 includes a suitable detector and a video amplifier and produces unidirectional current pulses of positive polarity from the intermediate frequency energy and feeds these pulses on to a pass circuit 106 through a video amplifier. In effect, pass circuit 106 is a pulse amplitude and pulse slope selective circuit which discriminates between desired signal pulses and undesired interfering pulses. Such a pulse amplitude and pulse selective circuit is disclosed and claimed in detail in my copending application Serial No. 557,524, filed October 6, 1944, U.S. Patent No. 2,561,772, dated July 24, 1951. The output from the pass circuit 106 is fed to a clipper circuit 107, which in effect comprises a pair of tubes arranged to remove a horizontal slice from the center portion of the pulse applied thereto by the pass circuit. Stated in other words, clipper circuit 107 may be termed a top and bottom limiter for removing noise from the tops of the applied pulses and from the spaces between the pulses. The clipped or clean pulses from 107 are applied to a band pass filter 108 which changes the wave form of the rectangular wave pulses applied to the band pass filter to sine waves for application to the detector 109. Detector 109 may be a phase or frequency modulation type of detector, depending upon the type of modulation impressed on the pulses by the remote transmitter. This detector may include suitable discriminator and rectifier circuits in a manner well known in the art. The output of the detector is passed on to a band pass filter 110, which is sufficiently wide to pass the frequencies covering the signal modulation. As an example, if the signal modulation involves telephony, band pass filter 110 may pass signals in a range from 300 cycles to 3500 cycles. The output from the band pass filter 110 is fed into an audio amplifier system 111, which in turn is coupled to a suitable electro-acoustic transducer such as a loudspeaker or headphones 112.

In order to achieve the results of the present invention, the remote transmitter also impresses on the signal pulses a pilot tone which has a frequency outside the range of the audio filter 110. This pilot tone, in the example given above, may be a frequency below 300 cycles or above 3500 cycles. Thus, only one set of pulses are transmitted from the remote transmitter and this set of pulses carries both the message and the pilot tone modulations.

This pilot tone is taken from the output of the detector 109 and passed via lead 132 to a pilot tone filter circuit including an amplifier and a rectifier, herein designated 113. Apparatus 113 comprises, in effect, a narrow filter which passes the pilot tone but rejects the modulation frequencies produced by the message waves. At this time it should be understood that the band pass filter 110 is designed to reject the pilot tone, so as to prevent it from being passed on to the audio system 111 and from being heard in the loudspeaker or headphones 112. The output from 113 is passed on to an automatic gain control (AGC) circuit 114 which is used to control the gain level of the receiver through lead 131 extending to suitable grid electrodes of the tubes of the intermediate frequency amplifier system 105. Suitable connections 115 and 116 from an intermediate portion and from the output, respectively, of the pass circuit 106 connect to the AGC circuit 114 in order to assure discrimination in the AGC circuit between the desired and undesired received pulses, as a result of which the gain of the receiver is maintained at the proper level despite the presence of interfering pulses which may be of higher amplitude than the desired pulses. The particular circuit details for accomplishing this result is shown in Fig. 2 and described in detail hereinafter.

Referring now to Figure 2, the antenna 101, the radio frequency amplifier 102, the frequency converter 103, the local oscillator 104, and the intermediate frequency amplifier stage 105 are shown in box form in the manner similar to the showing of Fig. 1, inasmuch as these circuit elements are well known in the art and are not being claimed per se, except in combination with the novel circuit details of the invention. However, the pass circuit 106, the AGC circuit 114, and the pilot tone amplifier-rectifier-and-filter circuit 113 are shown and described below in considerable detail.

*Pass circuit*

Referring to the pulse amplitude and slope selective circuit 106 in more detail, it will be seen that both the desired signal pulses and the undesired interfering pulses are supplied from the intermediate frequency amplifier 105 to the terminal 1. These pulses will be of positive polarity. The pass circuit 106 is provided with an output terminal 26 from which only the desired signal pulses are obtained. Between terminals 1 and 26, there are provided evacuated electron discharge devices 4, 9, 10, 18, 19 and 24 with associated circuit elements for separating the desired from the undesired pulses. Vacuum tube 4 serves to amplify the pulses applied to terminal 1 and to invert the polarity of the applied pulses from a positive to a negative sign. The control grid of tube 4 is connected through a resistance 3 to a potentiometer 27, which serves to supply an adjustable bias to the control grid of the tube. Output pulses of negative polarity are taken from the anode of vacuum tube 4 and pass through the primary winding of an iron core pulse transformer 28. This transformer inverts the polarity of the negative pulses appearing in the primary winding and supplies positive pulses to the control grids of screen grid vacuum tubes 9 and 10 which are connected in electrically parallel relation to the secondary winding of transformer 28 through condensers 5 and 7, respectively. The control grids of tubes 9 and 10 obtain a bias through resistors 6 and 8, respectively, from a potentiometer 25 across whose terminals there is connected a common bias battery 48. Tubes 9 and 10 are preferably of a sharp cut-off type and are differentially biased by means of battery 11 in the cathode circuit of tube 9. It should be understood that battery 11 shows only one way of obtaining a differential bias and that the invention is not limited to this circuit detail since, if desired, a differential bias may be obtained, for example, by directly grounding the cathode of tube 9 and obtaining a grid bias for this tube through resistor 6 from another potentiometer which can be connected across battery 48.

The anodes of tubes 9 and 10 are connected to opposite terminals of a potentiometer 12 which has a suitable positive polarizing potential connected to a point intermediate its ends through resistor 50 and a variable tap 51. The potentiometer 12 thus permits the gain of the two tubes 9 and 10 to be differentially adjusted by providing different anode loads for the tubes. The condenser 13 positioned across the terminals of potentiometer 12 is arranged so as to equalize the phase shift between the two sides of the circuit. In effect, this condenser enables the time constants of the anode circuits of the tubes 9 and 10 to be the same, irrespective of the values of the individual resistor loads on the anode circuits when the tap 51 is off the center of the potentiometer 12. Once the potentiometer 12 and condenser 13 are adjusted, this adjustment will hold for a large range of amplitudes of the interfering pulses. The best adjustment is slightly different for very high amplitudes than for lower amplitude pulses. Output from tubes 9 and 10 is in the form of negative pulses.

Negative pulses from the anodes of tubes 9 and 10 are applied to the grids of triode vacuum tube amplifiers 18 and 19 (operating class A) through condensers 14 and 16, respectively. The grids of tubes 18 and 19 are connected through resistors 15 and 17, respectively, to the negative terminal of a bias battery 52. This battery is shunted by a by-pass condenser, as shown. Condenser 14 and resistor 15 form a differentiator circuit. Condenser 16 and resistor 17 also form a differentiator circuit. The tubes 18 and 19 serve to invert the polarity of the pulses applied to their grids and supply positive pulses from their anodes to the primaries of the pulse transformers 20 and 21. The secondary of transformer 20 is connected so as to produce negative pulses in lead 53, while the secondary of transformer 21 is reversed relative to that of transformer 20 so as to produce positive pulses in the same lead. The secondaries of transformers 20 and 21 are connected together through lead 53 and the resultant voltage appearing therein applied through condenser 22 to the control grid of the output screen grid vacuum tube 24. The output of tube 24 appears as negative pulses at terminal 26.

In the operation of the system 106, for separating desired from undesired pulses, the differential bias of battery 11 is preferably made to be nearly equal to the anode current cut-off bias of tube 9. The common bias through potentiometer 25 is made to be large enough to maintain tubes 9 and 10 well below the anode current cut-off condition, the exact value of this common bias depending upon the amplitude of the pulses applied to the grids of these tubes. From an inspection of the drawing it will be evident that the tube 9 is given a greater bias than the tube 10 so that there is required a pulse of greater magnitude to be applied to tube 9 in order to pass through this tube than through tube 10. In order to discriminate between pulses of different amplitudes, the circuit adjustments are so made that the desired signal pulse is permitted to pass through only one side of the circuit; namely only through tube 10 and not through tube 9. Pulses of greater magnitude than a desired pulse, such as interfering pulses, will pass through both side of the circuit; namely through both tubes 9 and 10, and will cancel or be bucked out in the outputs of transformers 20 and 21. Interfering pulses of smaller magnitude than that of the desired signal pulse will not pass through either tube 9 or 10.

Let us assume first that a single positive pulse of low amplitude is applied to the grids of tubes 9 and 10 through tube 4 and this pulse is insufficient to overcome the negative bias on the grids of tubes 9 and 10. Due to the greater negative bias supplied from potentiometer 25, it will be seen that there will be no output pulse in the anode circuit of either tube 9 or 10. Now if this single positive pulse of low amplitude in the input circuits of tubes 9 and 10 is gradually increased in amplitude, a point will be reached where a pulse will appear in the output of tube 10 but not in the output of tube 9, due to the differential bias supplied by battery 11. This pulse which appears in the output of tube 10 will pass through tubes 19 and 24 and appear in output terminal 26. If, however, the amplitude of the pulse applied to the grids of tubes 9 and 10 is increased still further, to a magnitude sufficient to overcome the negative bias of tube 9, a pulse will appear in the outputs of both tubes 9 and 10 and the secondaries of transformers 20 and 21. Under this condition, if the gain through the two sides of the circuit composed of tubes 9 and 10 is adjusted by potentiometer 12 and the phase shift adjusted by condenser 13, then pulses in the secondary windings of transformers 20 and 21 will cancel or buck each other and nothing will appear in the output of tube 24. This adjustment will not affect the operation of the system at lower amplitudes.

Condenser-resistor circuits 5, 6, and 7, 8 in the inputs of tubes 9 and 10 are differentiator circuits. Condenser-resistor circuits 14, 15 and 16, 17 in the outputs of tubes 18 and 19 are also differentiator circuits. These differentiating circuits are given short time constants and aid in separating pulses of substantially equal amplitudes and of different slopes. It is known in the art that the voltage appearing across the resistor of an R-C differentiating circuit is proportional to the slope of an applied voltage pulse. The leading edge of this applied voltage pulse can be represented at least to a first approximation by the expression: Voltage $e=kt$, where $k$ is the slope and $t$ the time. This principle is utilized in the present invention to separate pulses of different slopes.

In a system wherein it is desired to separate pulses on an amplitude and slope basis, the following seven conditions may be encountered. Under each one of these conditions, a description is given of the way the pulses can be separated or distinguished in the system of Fig. 1. In the following description the undesired interfering pulse is represented by the letter U, while the desired or signal pulse is represented by the letter S.

(1) U is higher in amplitude than S and of the same slope at the grids of tubes 9 and 10. U will pass through both tubes 9 and 10 and be cancelled or bucked out in the outputs of transformers 20 and 21. S will pass through tube 10 only and will be amplified in tubes 19 and 24 and appear at output terminal 26.

(2) U is lower in amplitude than S and of the same slope at the grids of tubes 9 and 10. U cannot go through either tube 9 or 10 because its amplitude is insufficient to overcome the common bias potential supplied by potentiometer 25. S will pass through tube 10 and will be amplified in tubes 19 and 24 and will appear at output terminal 26.

(3) U and S are the same or almost the same in amplitude and of the same slope at the grids of tubes 9 and 10. In this condition, it is impossible to eliminate U within a small range of voltages. This small percentage range of voltages in which U and S cannot be separated can be reduced by amplifying the voltages of U and S before their application to tubes 9 and 10, and then increasing the bias applied by potentiometer 25, so as to distinguish between the different pulses applied to tubes 9 and 10 in a manner described above in connection with the above conditions 1 and 2. It should be understood that although the actual voltage range is constant, the percentage range (of applied voltage) is reduced with increased amplitude.

(4) U and S are of the same amplitude but S is steeper in slope at the grid of tube 4. By virtue of the differentiating action of the transformer 28 and circuits 5, 6 and 7, 8, the amplitude of S will be higher than that of U on the grids of tubes 9 and 10. By adjusting potentiometer 25, it is possible to prevent U from passing through either tube 9 or 10, in the manner described above in connection with condition 2, while permitting S to pass through tube 10.

(5) U and S are of the same amplitude but U is steeper in slope at the grid of tube 4. U will now have a greater amplitude on the grids of tubes 9 and 10 than S, due to the differentiating action of the transformer 28 and circuits 5, 6 and 7, 8. It is now possible to cause U to pass through both tubes 9 and 10 so that the outputs of transformers 20 and 21 cancel and buck each other, while S passes only through tube 10 and tubes 19 and 24 and appears at the output terminal 26. The adjustment of potentiometer 25 enables a suitable adjustment in the bias of the two tubes 9 and 10 so that this condition can be fulfilled. It should be noted at this time that subsequent to the differentiating action the separation of the pulses follows substantially condition 1.

(6) U is of lower amplitude than S but of steeper slope at the grid of tube 4. By adjusting the grid bias of the tube 4 by means of potentiometer 27, it is possible to eliminate U and prevent it from passing tube 4. If this were not done, U and S might appear on the grids of tubes 9 and 10 as pulses of the same amplitude, which is a condition it is desired to avoid.

(7) S is of lower amplitude than U but of steeper slope at the grid of tube 4. The amplitude of S will be raised with respect to U by virtue of the differentiating action of the transformer 28 and the circuits 5, 6, and 7, 8. Potentiometer 25 is now adjusted so as to permit U and S to pass only through the tube 10. Due to the differentiating action of condenser 16, resistor 17, and transformer 21, the amplitude of the steeper sloped pulse S will now be higher than the amplitude of U in the output of transformer 21. By adjusting the bias on potentiometer 39 in the input circuit of tube 24, it is now possible to remove or prevent U from passing the tube 24 while permitting S to pass through this tube.

In a practical embodiment of the invention, the differential bias between tubes 9 and 10 may amount to three volts, which amount is sufficient to separate the incoming pulses differing in amplitude by three volts. It will be seen that the range of pulse amplitudes to which the pass circuit 106 will respond (expressed as a percentage of the mean amplitude) is a function of the applied amplitude and that this percentage becomes smaller as the amplitude is increased. It should also be understood that for best results the video or audio amplifier in box 105 which precedes the pass circuit 106 should be designed with time constants which do not increase the pulse length, and its voltage handling ability should be such that no limiting takes place.

*AGC circuit*

The AGC circuit 114 maintains the receiver gain at the proper level in the presence of interfering pulses which can be of higher amplitude than the desired pulses, and this is done by apparatus which enables the receiver to distinguish between the desired and undesired pulses. For this purpose, a pilot tone is transmitted on the desired pulses from the remote transmitter, and this pilot tone is preferably outside the audio response range of the receiver. In what follows, it is assumed that the interfering pulse is of higher amplitude than the desired pulse, and that it does not appear at exactly the same time as the desired pulse. In other words, the undesired (interfering) pulses are not superimposed on the desired signal pulses. The desired signal pulse is herein referred to as S, while the undesired (interfering) pulse is referred to as U. At point 100, which is in the plate circuit of tube 10 in the pass circuit, both U and S will be present; while at the output terminal 26 of the pass circuit only S will be present. Both U and S at these points are of negative polarity, as indicated. Due to the input-output characteristic of the pass circuit 106 (note Fig. 3), it will be seen that it is the S pulse at point 100 which must be used to provide the AGC connection and this must be separated in some manner from U which also appears at this point. This is accomplished by means of a coincidence counter comprising pentode tubes 119 and 120 in the AGC circuit 114. Both tubes 119 and 120 are normally conducting and are so designed that the flow of current therethrough ceases or blocks upon the application of a low negative voltage to their control grids. These tubes have sharper cut-off characteristics than conventional triode tubes. Both U and S appear on the control grid of tube 119 through linear amplifier coupling tube 117 and pulse transformer 118. The negative pulse on lead 115 connected to point 100 biases tube 117 to a point dependent upon the amplitude of the pulse and produces a positive pulse on the primary of the transformer 118, as a result of which a negative pulse is applied to the control grid of tube 119. Only S appears on the control grid of tube 120 in the form of a negative pulse supplied by terminal 26 and lead 116, and any pulse of amplitude higher than C in Fig. 3 is sufficient to cut off the flow of current through tube 120. The negative pulse applied to the grid of tube 120 has sufficient magnitude to cut off the flow of current through this tube for the duration of the applied pulse. Tube 120 is therefore independent of changes in amplitude of S for any amplitude above line C in Fig. 3. The line C is made to occur at as low an output value as is practical.

Since tube 119 and tube 120 are operated with zero grid bias, it will be seen that the plate voltage is quite low. A negative pulse on the control grid of only one tube 119 or 120 will cause only a slight rise in plate voltage of tubes 119 and 120, because current will be flowing through the other tube 120 or 119. This is what happens when the U pulse appears in the absence of the S pulse. When a negative pulse appears on the control grids of both tubes 119 and 120, the plate voltage on these tubes will rise nearly to the magnitude of the supply voltage +B if the current through both tubes 119 and 120 is cut off, because no current will pass through resistor 139 in this condition. If the flow of current through one tube 119 or 120 is cut off and simultaneously the current in the other tube 120 or 119 is varied, the plate voltage on these tubes will also vary in proportion to the variation in current through one of these tubes. This is what happens when the S pulses appear. The U pulse may or may not cut off tube 119. The U pulse on the grid of tube 119 will always produce a slight voltage pulse on the lead 150 extending to the grid of separator tube 124 whether or not tube 119 is cut off. This is because the U pulse will never affect tube 120 under the assumption that U is bigger than S. The S pulse will cut off tube 120 and also vary the current through tube 119, depending upon the amplitude of the pulse.

The small amplitude pulses appearing on the plates of tubes 119 and 120 due to the U pulses only, assuming the absence of S pulses, is biased off by potentiometer 123, and thus do not affect amplifier separator tube 124. Putting it in other words, the grid bias supplied to the tube 124 by potentiometer 123 is such that no current will flow through tube 124 when only the small amplitude pulses produced by U appear. The variable amplitude pulses from S are amplified by tube 124 and applied through pulse transformer 125 to the RC circuit 128 and the right half of double-diode 127. As a result, the effective pulses on the control grid of tube 124 are the S pulses only, and it is these pulses which are then applied to the RC circuit 128 through the pulse transformer 125 and the right half of the diode 127. The direct current voltage built up across the RC circuit 128 is used to supply AGC control voltage to the AGC lead 131. This voltage is proportional to the amplitude of the S pulses. When S grows in amplitude, there is a greater voltage applied to the control grid of tube 124, a resulting greater output voltage from tube 124, and hence a greater voltage across RC circuit 128 for application to the lead 131. The larger the voltage on lead 131, the lower will be the gain through the intermediate frequency amplifier stage 105.

In one experimental circuit tried out in practice, a positive AGC voltage was needed and applied to the lead 131. This posititve voltage on lead 131 was used to reduce the plate voltage on a tube which used the same plate voltage supply for the screen grids of the IF tubes in 105. Thus, the positive voltage on lead 131 reduced the screen grid voltage in the IF tubes of 105. It will be obvious, however, that if a negative AGC voltage is desired on the lead 131 it can be obtained by a redesign of the diode circuits.

While the foregoing has been going on, the pilot tone (either the modulating tone or the pulse repetition frequency) has been detected by 109, applied to lead 132, selected from the message frequencies present by the narrow pilot tone filter 145, amplified by the pilot tone amplifier tubes 134 and 135, and then rectified by tube 136 (circuit 113). Potentiometer 133 in box 113 is used to adjust the gain of the pilot tone to the proper value. The pilot tone amplifier and rectifier system 113 is so arranged that it builds up a negative direct current voltage across the RC circuit 141 which is applied via lead 151 to the grids of pentode tubes 130 and 137. Tube 137 is normally conducting and may be called an AGC squelch tube. Tube 130 is a blocking oscillator. The application of negative direct current voltage via lead 151 to the control grids of these tubes cuts off the flow of current through these tubes, as a result of which these tubes have no affect on the operation of the AGC circuit 114 in controlling the gain level of the receiver.

If the remote transmitter (not shown) is shut off, obviously there will be no S pulses received at the receiving system and consequently there will be no pilot tone. As a result of this, there will be no bias for the tubes 130 and 137 which normally operate at zero grid bias under this condition. Tube 137, in the absence of pilot tone causing a cut-off bias to be applied to its grid, will then have current flowing through it and thus reduce the plate voltage available for the operation of tubes 119 and 120 (coincidence counter), due to the voltage (IR) drop across resistor 139 caused by the flow of current through tube 137, and hence no pulses can pass through the separator tube 124 or be supplied to the AGC double-diode 127. Under this condition of operation, the receiver gain is increased to a maximum value determined by the setting of the potentiometer 126 in the cathode circuit of the double-diode 127. If the remote transmitter is now turned on at this particular time, no S pulses will appear at the output terminal 26 of the pass circuit, due to the operation of the pass circuit in causing the bucking out or cancellation of pulses of too high an amplitude. These pulses of high amplitude will be caused by the high gain of the receiver in this condition.

To overcome this, the gain of the receiver is periodically raised and lowered by means of the pulse or blocking oscillator 130 at a rate in the range between two to ten cycles per second. This blocking oscillator 130 produces short pulses at a low frequency rate from 2 to 10 cycles per second, and these pulses charge up condenser 140 through the left hand portion of double diode tube 127. After one of these short pulses from the oscillator 130 (which causes the application of a large voltage to the AGC lead 131 via double-diode 127) the receiver gain is reduced quickly, and this gain gradually rises as the charge leaks off the condenser 140. As the receiver gain gradually rises, a point will be reached where the AGC adjustment is correct to pass the desired signal pulse, as a result of which the S pulse (if present) will appear at output terminal 26 of the pass circuit 106, and at the same time the rectified pilot tone will appear across the RC circuit 141 to thereby cut off the pulse oscillator. The rectified pilot tone appearing as a negative voltage on lead 151 will cut off the flow of current through tubes 130 and 137, thus stopping the pulse oscillator and raising the plate voltage for tubes 119 and 120. The AGC circuit can then function in the manner previously described for the presence of both S and U pulses.

There is another possible operating condition in which there are U pulses present but no S pulses. In this case, the receiver will be "hunting" for the proper gain level due to the fact that the pulse oscillator 130 will be producing short pulses at a low frequency rate. If the U pulses are of sufficient amplitude to pass through both tubes 9 and 10 of the pass circuit, the U pulses will be bucked out or cancelled in the pass circuit 106 before they even reach output terminal 26, as a result of which only U pulses which pass through tube 10 and appear on lead 115 will be effective to cut off tube 119. However, when the U pulses are of such magnitude as to pass only through tube 10, they will appear on both leads 115 and 116 to thereby cut off the flow of current through both tubes 119 and 120 of the coincidence counter. However, in this case no input pulses will be passed by separator tube 124 in view of the fact that the lack of pilot tone maintains the plate voltage for tubes 119 and 120 reduced because of the flow of current through tube 137. Hence, the receiver will not "lock-in" and control the gain of the receiver on the wrong pulses but will continue to "hunt"; that is, have its gain periodically raised and lowered. In view of the foregoing, it will be seen that only the S pulses will cause the AGC circuit to lock the receiver at the proper gain level for the passage of the intelligence, due to the fact that only the S pulses have the pilot tone superimposed thereon.

The invention has been described above in connection with the use of a pilot tone outside the frequency range of the message wires, in which the tone (250 cycles for example) is applied as modulation to the S pulses along with any voice modulation. The voice modulation may or may not be present. This pilot tone is selected or separated from the frequencies present by the narrow band pass pilot filter 145 having a mid-band frequency of 250 cycles.

An alternative method of using the pilot tone feature is to use the S pulse repetition frequency as a pilot tone. For example, let us assume that the S pulses are at a 20 kc. repetition rate. Only voice modulation frequencies are used for modulation. Then the pilot tone filter 145 would select the 20 kc. frequency. This method will not work satisfactorily if the interfering pulses are also at a 20 kc. rate but will work if the S pulse rate and the interfering pulse rate are different.

If the U and S pulses have the same rate, then the first method described above should be used since the S pulses will have a 250 cycle tone modulation and the U pulses will not have such a modulation. The only change in the circuit will be the midband frequency of the pilot tone filter 145 which is outside the voice frequency range of the audio filter 110.

What is claimed is:

1. The method of operating a receiver which includes conditioning said receiver to be continuously receptive, periodically varying the gain of the receiver during the absence of received message waves and while said receiver is continuously receptive and utilizing the received message waves to control the gain of the receiver at a desired level.

2. The method of operating a signal wave receiver which includes conditioning said receiver to be continuously receptive, periodically varying the gain of the receiver over a range of levels during the absence of received waves of a desired frequency and while the receiver is continuously receptive, stopping the periodic variation in gain of the receiver upon the receipt of said waves of said frequency, and controlling the gain of the receiver in accordance with the amplitude components of said received waves.

3. The method of operating a signal wave receiver which includes conditioning said receiver to be continuously receptive, periodically varying the gain of the receiver over a range of levels and at a rate below the highest modulation frequency during the absence of received waves of a desired frequency and while the receiver is continuously receptive, stopping the periodic variation in gain of the receiver upon the receipt of said waves of said frequency, and controlling the gain of the receiver in accordance with the amplitude of said received waves.

4. The method of operating a signal wave receiver which includes conditioning said receiver to be continuously receptive, periodically varying the gain of the receiver over a range of levels during the absence of received waves of a desired frequency and a rate appreciably below said desired frequency and while the receiver is continuously receptive, stopping the periodic variation in gain of the receiver upon the recepit of said waves of said desired frequency, and controlling the gain of the receiver in accordance with the amplitude components of said received waves.

5. The method of operating a pulse communication system having a transmitter and a remotely located receiver, which comprises sending out from said transmitter pulses modulated by message waves in the frequency range of approximately 300 to 3500 cycles, and also modulated by a pilot tone whose frequency is outside said frequency range, receiving at the receiver said pulses and also interfering pulses, separating the received message wave pulses from the received interfering pulses in accordance with a distinguishing characteristic of said pulses, periodically varying the gain of the receiver at a low frequency rate in the absence of the pilot tone modulation, stopping this periodic variation in gain during the receipt of the separated pulses having the pilot tone modulation, and controlling the gain of the receiver at a level determined by the amplitude of the pulses carrying both types of modulation.

6. In a pulse communication receiver, an automatic gain control circuit including a pulse oscillator, circuit elements so coupling said oscillator to said receiver that the gain of said receiver varies periodically at the repetition rate of the pulses produced by said oscillator, and an electron discharge device circuit responsive to received waves of a predetermined frequency for rendering said oscillator ineffective to affect the gain of said receiver.

7. In a superheterodyne receiving system, an automatic gain control circuit including a source of recurring waves and a rectifier coupling the output of said source to an intermediate frequency amplifier stage of said receiver to thereby vary the gain of said receiver periodically at the frequency of said recurring waves, and an electron discharge device circuit responsive to waves of a predetermined frequency received by said system for rendering said source of recurring waves inoperative.

8. In a pulse communication receiver, a pulse amplitude selective circuit for distinguishing between signal pulses of a desired amplitude and interfering pulses of a different amplitude, and means for controlling the gain of said receiver from only the signal pulses while disregarding the interfering pulses, said means including a pair of electrode structures biased to pass current under one condition of operation of said receiver, a connection for supplying a cut-off bias potential to one of said electrode structures whenever a signal pulse or an interfering pulse of greater magnitude than said signal pulse is supplied to said selective circuit, a connection from the output of said selective circuit for supplying a cut-off bias potential to the other of said electrode structures due to the passage through said selective circuit of a signal pulse, an electron discharge device coupled to said electrode structures and responsive to a voltage appearing on said structures during the condition when one structure is cut off and the cut-off bias potential varied on the other structure, and a rectifier for rectifying the output of said electron discharge device and for supplying the resultant rectified voltage to said receiver as a gain control voltage.

9. In a pulse communication receiver, a pulse amplitude selective circuit for distinguishing between signal pulses of a desired amplitude and interfering pulses of a different amplitude, and means for controlling the gain of said receiver from only the signal pulses while disregarding the interfering pulses, said means including a pair of electrode structures biased to pass current under one condition of operation of said receiver, a connection for supplying a cut-off bias potential to one of said electrode structures whenever a signal pulse or an interfering pulse of greater magnitude than said signal pulse is supplied to said selective circuit, a connection from the output of said selective circuit for supplying a cut-off bias potential to the other of said electrode structures due to the passage through said selective circuit of a signal pulse, an electron discharge device coupled to said electrode structures and responsive to a voltage appearing on said structures during the condition when one structure is cut off and the cut-off bias potential varied on the other structure, a potentiometer for varying the bias on said electron discharge device to thereby prevent the passage therethrough of pulses of smaller amplitude than those required for the control of the receiver gain, and a rectifier for rectifying the output of said electron discharge device and for supplying the resultant rectified voltage to said receiver as a gain control voltage.

10. In a pulse communication receiver, a pulse amplitude selective circuit for distinguishing between signal pulses and interfering pulses of a higher amplitude, a pair of electrode structures biased to pass current under one condition of operation of said receiver, a connection for supplying a cut-off bias potential to one of said electrode structures whenever a signal pulse or an interfering pulse of greater magnitude than said signal pulse is supplied to said selective circuit, a connection from the output of said selective circuit for supplying a cut-off bias potential to the other of said electrode structures due to the passage through said selective circuit of a signal pulse, an electron discharge device coupled to said electrode structures and responsive to a voltage appearing on said structures during the condition when one structure is cut off and the cut-off bias potential varied on the other structure, and a rectifier for rectifying the output of said electron discharge device and for supplying the resultant rectified voltage to said receiver as a gain control voltage, a pulse oscillator also coupled to said rectifier for causing the periodic application to said receiver of gain control voltages of a value which will increase the receiver gain to substantially its maximum value, a squelch tube in circuit with said pair of electrode structures for rendering the same ineffective to operate said electron discharge device, and means responsive to a wave of a predetermined frequency for rendering both said pulse oscillator and said squelch tube ineffective to thereby enable the gain of the receiver to be controlled by said signal pulses.

11. In a pulse communication receiver system, the combination with a pulse amplitude selective circuit for distinguishing between signal pulses of a desired amplitude and interfering pulses of a different amplitude, said selective circuit comprising a pair of vacuum tube electrode structures, each having an input circuit and an output circuit, means for biasing said input circuits differently, means for applying the output pulses from the receiver to both of said input circuits in electrically parallel relation, and means for cancelling those pulses which appear simultaneously in the output circuits of both said electrode structures, of a pair of pentode tubes biased to pass current under one condition of operation of the system, a connection for supplying a cut-off bias potential to one of said pentode tubes whenever a signal pulse or an interfering pulse of greater magnitude than said signal pulse is supplied to said selective circuit, a connection from the output of said selective circuit for supplying a cut-off bias potential to the other of said pentode tubes due to the passage through said selective circuit of a signal pulse, an electron discharge device coupled to said pentode tubes and responsive to a voltage appearing on said tubes during the condition when one tube is cut-off and the cut-off bias potential varied on the other tube, and a rectifier for rectifying the output of said electron discharge device and for supplying the resultant rectified voltage to said receiver as a gain control voltage.

12. The method of operating a pulse system having a transmitter and a remotely located receiver, which comprises sending out from said transmitter pulses modulated by two different types of modulation, receiving said pulses on said receiver, controlling the gain of the receiver at a level determined by a useful characteristic of the received pulses only so long as both types of modulation are present, and varying the gain of the receiver periodically between two limits on opposite sides of the normal gain in the absence of one of said types of modulation from the received pulses.

13. In a receiver, an amplifier stage followed by a pulse selective circuit, an automatic gain control circuit coupled between said pulse selective circuit and said amplifier stage, a source of recurring waves in said automatic gain control circuit for periodically varying the gain of said receiver at a frequency related to the frequency of said recurring waves, and means under control of waves received by said receiver for rendering said source ineffective.

14. In a multi-stage pulse receiver having an amplifier stage, an automatic gain control circuit including a pulse oscillator operating at a low frequency rate of the order of several pulses per second and at a frequency below the repetition rate of the signal pulses to be received by said receiver, and means coupling the output of said oscillator to said amplifier stage of said receiver for supplying said amplifier stage with a recurring bias voltage, to thereby vary the gain of said receiver periodically at the repetition rate of the pulses produced by said pulse oscillator.

15. The method of operating a controllable gain pulse receiver which comprises causing a received pulse of desired amplitude to produce a pair of simultaneously occurring impulses on separate paths, causing an undesired received pulse of larger amplitude and occurring at a different time than the desired pulse to produce another impulse on only one of said paths, producing from said last impulse a voltage variation which is of insufficient magnitude to affect the gain of the receiver producing from said pair of simultaneously occurring impulses a voltage variation of sufficient magnitude to affect the gain of the receiver, and utilizing said last voltage variation to control the gain of the receiver.

16. In a pulse communication system having a transmitter and a remote controllable gain receiver, the method of operation which includes transmitting from said transmitter pulses modulated by message waves, superimposing on said pulses an alternating current of a frequency outside the frequency range of said message waves, receiving said pulses by said receiver, separating the superimposed alternating current from said received pulses, controlling the gain of said receiver at a level determined by the amplitude of the received modulated pulses, and periodically varying the gain of said receiver solely during the absence of received waves having said superimposed alternating current while preventing received waves from affecting the gain of said receiver during the absence of received signals modulated by said alternating current.

17. The method of operating a pulse system having a transmitter and a remotely located receiver, which comprises sending out from said transmitter pulses modulated by two different types of modulation, receiving said pulses on said receiver, controlling the gain of the receiver at a level determined by the amplitude of the received pulses only so long as both types of modulation are present, and periodically raising and lowering the gain of the receiver in the absence of one of said types of modulation from the received pulses.

18. The method of operating a pulse communication system having a transmitter and a remotely located receiver, which comprises sending out from said transmitter pulses modulated by message waves in the frequency range of approximately 300 to 3500 cycles, and also modulated by a pilot tone whose frequency is outside said frequency range, receiving at the receiver said pulses, periodically varying the gain of the receiver at a low frequency rate in the absence of the pilot tone modulation, stopping this periodic variation in gain during the receipt of the pilot tone modulation, and controlling the gain of the receiver at a level determined by the amplitude of the pulses carrying both types of modulation.

19. The method of operating a controllable gain pulse receiver having a source of electrons and a control element for said source, said element being biased to cut off, which comprises causing a received pulse of desired magnitude to produce a pair of simultaneously occurring impulses on separate paths, causing an undesired received pulse of larger amplitude and occurring at a different time than the desired pulse to produce another impulse on only one of said paths, producing from said last impulse a voltage variation and applying said voltage variation to said control element, said voltage variation being of insufficient magnitude to cause a flow of electrons to pass said control element, producing from said pair of simultaneously occurring impulses a voltage variation and applying said last voltage variation to said control element, said last voltage variation being of sufficient magnitude to cause a flow of electrons to pass said control element and utilizing the flow of electrons passing said control element to control the gain of the receiver.

References Cited in the file of this patent

UNITED STATES PATENTS

| | | |
|---|---|---|
| 1,480,216 | Mills | Jan. 8, 1924 |
| 1,742,902 | Deloraine et al. | Jan. 7, 1930 |
| 1,978,482 | Villem | Oct. 30, 1934 |
| 2,060,969 | Beers | Nov. 17, 1936 |
| 2,065,826 | Roosenstein et al. | Dec. 29, 1936 |
| 2,098,286 | Garfield | Nov. 9, 1937 |
| 2,110,584 | Thompson | Mar. 8, 1938 |
| 2,165,062 | MacKay | July 4, 1939 |
| 2,173,173 | Lewis | Sept. 19, 1939 |
| 2,266,401 | Reeves | Dec. 16, 1941 |
| 2,299,390 | Holmes et al. | Oct. 20, 1942 |
| 2,318,075 | Hollingsworth | May 4, 1943 |
| 2,427,523 | Dolberg et al. | Sept. 16, 1947 |